US010372587B1

(12) United States Patent
Sternberg et al.

(10) Patent No.: US 10,372,587 B1
(45) Date of Patent: Aug. 6, 2019

(54) ELECTRONIC DEVICE MONITORING USING INDUCED ELECTROMAGNETIC EMISSIONS FROM SOFTWARE STRESS TECHNIQUES

(71) Applicant: THE UNITED STATES OF AMERICA AS REPRESENTED BY THE SECRETARY OF THE NAVY, Washington, DC (US)

(72) Inventors: Oren Sternberg, San Diego, CA (US); John D. Rockway, San Diego, CA (US); Mitchell Lerner, San Diego, CA (US); Israel Perez, Newport, RI (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 290 days.

(21) Appl. No.: 15/347,393

(22) Filed: Nov. 9, 2016

Related U.S. Application Data (60) Provisional application No. 62/253,018, filed on Nov. 9, 2015.

(51) Int. Cl.
*H05K 9/00* (2006.01)
*H04L 9/00* (2006.01)
*G06F 21/00* (2013.01)
*G06F 11/36* (2006.01)

(52) U.S. Cl.
CPC ...... *G06F 11/3616* (2013.01); *G06F 11/3612* (2013.01)

(58) Field of Classification Search
CPC .......... G06F 11/3616; G06F 11/3612
See application file for complete search history.

(56) References Cited

U.S. PATENT DOCUMENTS

| 5,430,392 | A | * | 7/1995 | Matejic | ................ | H04B 15/04 |
| | | | | | | 327/113 |
| 5,714,888 | A | * | 2/1998 | Naujoks | ............... | G01R 31/308 |
| | | | | | | 324/501 |
| 6,700,388 | B1 | * | 3/2004 | Mayor | ............... | G01R 29/0892 |
| | | | | | | 324/537 |
| 7,464,005 | B1 | | 12/2008 | Beetner et al. | | |

(Continued)

OTHER PUBLICATIONS

Endo et al. (Chosen-message Electromagnetic Analysis against Cryptographic Software on Embedded OS, p. 314-317 (Year: 2014).*

(Continued)

*Primary Examiner* — Mohammad K Islam
(74) *Attorney, Agent, or Firm* — Naval Information Warfare Center Pacific; Kyle Eppele; J. Eric Anderson (57) ABSTRACT

A method involves using one or more software programs to stress a powered electronic device in a test environment to induce controlled electromagnetic emissions from the powered electronic device, using the controlled electromagnetic emissions to generate an emission profile of the powered electronic device operating under stress, monitoring spurious electromagnetic emissions of the powered electronic device in an operational environment, and comparing the spurious electromagnetic emissions of the powered electronic device in the operational environment with the emission profile of the powered electronic device to determine that the powered electronic device is operating under stress in the operational environment.

20 Claims, 9 Drawing Sheets

(56) References Cited

U.S. PATENT DOCUMENTS

| | | | |
|---|---|---|---|
| 7,853,437 B2 | 12/2010 | Seguin et al. | |
| 8,726,048 B2 | 5/2014 | Naveh et al. | |
| 9,716,584 B2* | 7/2017 | Dubeuf | G06F 21/72 |
| 2002/0130774 A1* | 9/2002 | Bronson | H04W 52/283 |
| | | | 340/540 |
| 2003/0083831 A1* | 5/2003 | Agrawal | G06F 7/50 |
| | | | 702/65 |
| 2003/0126195 A1* | 7/2003 | Reynolds | G06F 1/14 |
| | | | 709/203 |
| 2007/0088504 A1* | 4/2007 | Jantunen | G01W 1/10 |
| | | | 702/4 |
| 2007/0120571 A1* | 5/2007 | Huie | G01R 31/002 |
| | | | 324/512 |
| 2009/0318103 A1* | 12/2009 | Feenaghty | H04B 17/29 |
| | | | 455/226.3 |
| 2010/0123453 A1* | 5/2010 | Pauly | G01R 29/0871 |
| | | | 324/76.11 |
| 2010/0157566 A1* | 6/2010 | Bogursky | H05K 9/0032 |
| | | | 361/816 |
| 2011/0256899 A1* | 10/2011 | Khazei | H04B 15/00 |
| | | | 455/517 |
| 2012/0179812 A1* | 7/2012 | Keller, III | F41A 17/06 |
| | | | 709/224 |
| 2012/0200313 A1* | 8/2012 | Kyue | H03K 19/0019 |
| | | | 326/8 |
| 2013/0082717 A1* | 4/2013 | Kim | G01R 31/001 |
| | | | 324/537 |
| 2013/0134298 A1* | 5/2013 | Maltere | G01J 1/18 |
| | | | 250/214.1 |
| 2013/0238264 A1* | 9/2013 | Kazama | G01R 31/088 |
| | | | 702/59 |
| 2013/0275646 A1* | 10/2013 | Kawasaki | G06F 13/4004 |
| | | | 710/307 |
| 2014/0047417 A1* | 2/2014 | Kaasila | G06F 11/3664 |
| | | | 717/135 |
| 2014/0068762 A1* | 3/2014 | Ostertun | G06K 19/07372 |
| | | | 726/22 |
| 2014/0111442 A1* | 4/2014 | Cok | G06F 3/044 |
| | | | 345/173 |
| 2015/0066415 A1* | 3/2015 | Hamilton | G01R 31/001 |
| | | | 702/119 |
| 2015/0084438 A1* | 3/2015 | Beckman | H02J 17/00 |
| | | | 307/149 |
| 2015/0227665 A1* | 8/2015 | Shepherd | G06F 17/5068 |
| | | | 716/132 |
| 2016/0124041 A1* | 5/2016 | Pathak | G01R 29/08 |
| | | | 324/629 |
| 2018/0115583 A1* | 4/2018 | Lewis | G09C 1/00 |

OTHER PUBLICATIONS

M. Guri, G. Kedma, A. Kachlon and Y. Elovici, "Airidopper: Bridging the Air-Gap between Isolated Networks arid Mobile Phones using Radio Frequencies," in 9th IEEE International Conference on Malicious arid Unwanted Software (MALCON 2014), Puero Rico, Fajardo, 2014.

Guri, Mordechai, et al. "BitWhisper: Covert Signaling Channel between Air-Gapped Computers using Thermal Manipulations." arXiv preprint arXiv:1503.07919 (2015).

Z. Z. X. a. H. W. Wu, "Whispers in the Hyper-space: High-speed Covert Channel Attacks in the Cloud," in USENIX Security symposium, 2012.

G. V. Jie Chen, "CC-Hunter: Uncovering Covert Timing Channels on Shared Processor Hardware," in MICRO-47 Proceedings of the 47th Annual IEEE/ACM International Symposium on Microarchitecture, 2014.

H. W. a. H. W. Ki Suh Lee, "PHY Covert Channels: Can you see the Idles?," in 11th USENIX Symposium on Networked Systems Design and Implementation (NSDI '14), Seattle, 2014.

T. Kohno, A. Broido, and K. Claffy. Remote physical device fingerprinting. In 2005 IEEE Symposium on Security and Privacy, pp. 211-225, Oakland, California, May 2005.

Kocher, C., Jaffe, J., Jun, B., Differential Power Analysis, Advances in Cryptology-CRYPTO' 99, LNCS1666, (1999), 388-397. Iokibe, Kengo, Tetsuo Amano, and Yoshitaka Toyota. "On-board decoupling of cryptographic FPGA to improve tolerance to side-channel attacks." Electromagnetic Compatibility (EMC), 2011 IEEE International Symposium on. IEEE, 2011.

Lawson, Nate. "Side-channel attacks on cryptographic software," Security & Privacy, IEEE 7.6 (2009): 65-68.

P. Kocher, "Timing Attacks on Implementations of Diffie-Hellman, RSA, DSS, and Other Systems," Cryptography Research, 1995; www.cryptography.com/resources/ whitepapers/TimingAttacks. pdf.

D. Brumley and D. Boneh, "Remote Timing Attacks Are Practical," Proc. 12th Conf. Usenix Security Symp., Usenix Assoc., 2003, p. 1.

Brier, Eric, Christophe Clavier, and Francis Olivier. "Correlation power analysis with a leakage model." Cryptographic Hardware and Embedded Systems-CHES 2004. Springer Berlin Heidelberg, 2004, 16-29.

Clavier, Christophe, Jean-Sébastien Coron, and Nora Dabbous. "Differential power analysis in the presence of hardware countermeasures." Cryptographic Hardware and Embedded Systems—CHES 2000. Springer Berlin Heidelberg, 2000.

Ikäheimonen, Tuure. "Measurement of Radar Spurious Emission with High Dynamic Range and Optimized Measurement Time." Instrumentation and Measurement, IEEE Transactions on 60.3 (2011): 1010-1016.

Monti, Giuseppina, et al. "Resonant energy scavenger for sensor powering by spurious emissions from compact fluorescent lamps." Sensors Journal, IEEE 14.7 (2014): 2347-2354.

Shannon, C. E. (1949). Communication in the presence of noise. Proceedings of the IRE, 37(1), 10-21.

\* cited by examiner

ELECTRONIC DEVICE MONITORING USING INDUCED ELECTROMAGNETIC EMISSIONS FROM SOFTWARE STRESS TECHNIQUES

CROSS-REFERENCE TO RELATED APPLICATIONS

This application claims the benefit of U.S. Provisional Patent Application Ser. No. 62/253,018 filed Nov. 9, 2015, entitled "Method of Wirelessly Transferring Data by Driving and Controlling Electronic Components' Power Emissions", the content of which is fully incorporated by reference herein.

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil; reference Navy Case Number 103418.

BACKGROUND

As many embedded devices are now linked with software control and diagnostics, with or without the internetworking of physical devices, systems and methods to defend against new types of attacks on these devices warrant an understanding of unwanted signal generation and how to control it.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein relate to a method that uses software diagnostic tools to generate induced spurious physical emissions from embedded devices over air-gapped (remote) channels. With this methodology, spurious emissions are induced during controlled computer operations such as dynamic memory allocation, hard disk writing, and computations. Spurious signals, also known as unwanted, unintended, or out-of-band emissions, are inherent to powered electronic components, subsystems and systems that might cause undesired interference. Each stressing operation creates a pulse in a modulation scheme. These software techniques can be used to provide repeatable measurements of embedded devices for mapping unwanted emissions over air-gapped channels. The unwanted emissions generated using the disclosed method may be used, for example, as a diagnostic tool for the embedded device to determine if the embedded device is under stress in an operational environment.

The generated emissions are induced via software stress testing and diagnostic and security applications including, for example, StressLinux (Linux), KALI (Linux) and a multitude of tools in Windows. Primarily, these tools and security tailored operating systems monitor and address load, stability, and environmental controls for personal computers as well as mobile and embedded devices. These tools may be used to stress embedded devices, which results in the occurrence of new induced emissions. However, it should be recognized that in some embodiments, other characterization techniques such as floating point, integer, bit manipulation, cache access and control flow, may be used, for example, for single and multi-core systems to generate and control emissions.

The resultant emissions are repeatable and appear around the normal background response of the device. As an example, three different software stress techniques that may be used to induce new and unwanted emissions over the background response of a given device are discussed in detail below. However, other software stress techniques may be used including, but not limited to specific mathematical operations such as Fourier transforms, Eigen values, correlation techniques, looping, floating point, integer, and bit manipulation. The software stress techniques may be used to induce a repeatable sequence of controlled emissions over the embedded device. As an example, the disclosed method may be used to calibrate the emission profile of a device, which can help in differentiating between normal operations and those operations from an unwanted attack on a device.

Figure 1A:
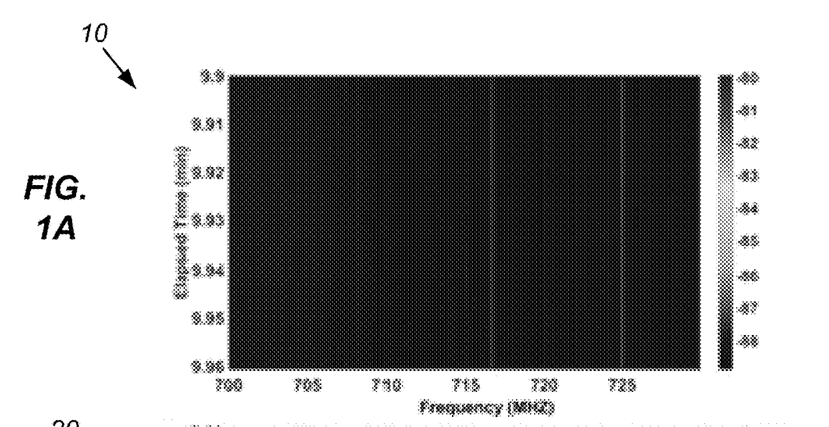
FIGS. 1A and 1B show graphs illustrating the measured inherent broadband RF response from two different embedded devices.
Figure 1B:
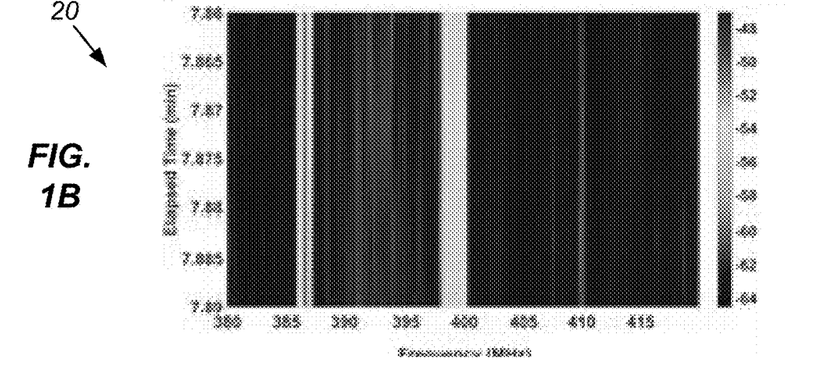

FIGS. 1A and 1B show graphs illustrating the measured inherent broadband RF emission response from two different embedded devices. Graph 10 in FIG. 1A presents the measured inherent broadband Radio Frequency (RF) emission spectrum response from a Raspberry PI 700 MHz (ARM1176JZF-S), Advanced reduced instruction set computer machines (ARM). Graph 20 in FIG. 1B presents the measured inherent broadband RF emission spectrum response from an Intel Galileo 2 (Quark SoC X1000). As an example, the emission response may be measured using a Tektronix Real time Spectrum Analyzer (RTSA) 3408B.

As shown in graph 10, several narrow band peaks are observed at 716, 720 and 725 MHz (bandwidth ~30 MHz) for the duration of 1.2 seconds. The magnitude of the peaks range from −86 to −84 dBm. As shown in graph 20, two strong emission bands are observed from the Intel Galileo 2. One band of 20 MHz bandwidth from 385 MHz to 387 MHz is observed for a duration of 7.2 seconds. An additional band is observed from 397 to 400 MHz. These responses range in magnitude from −58 to −54 dBm.

Figure 2:
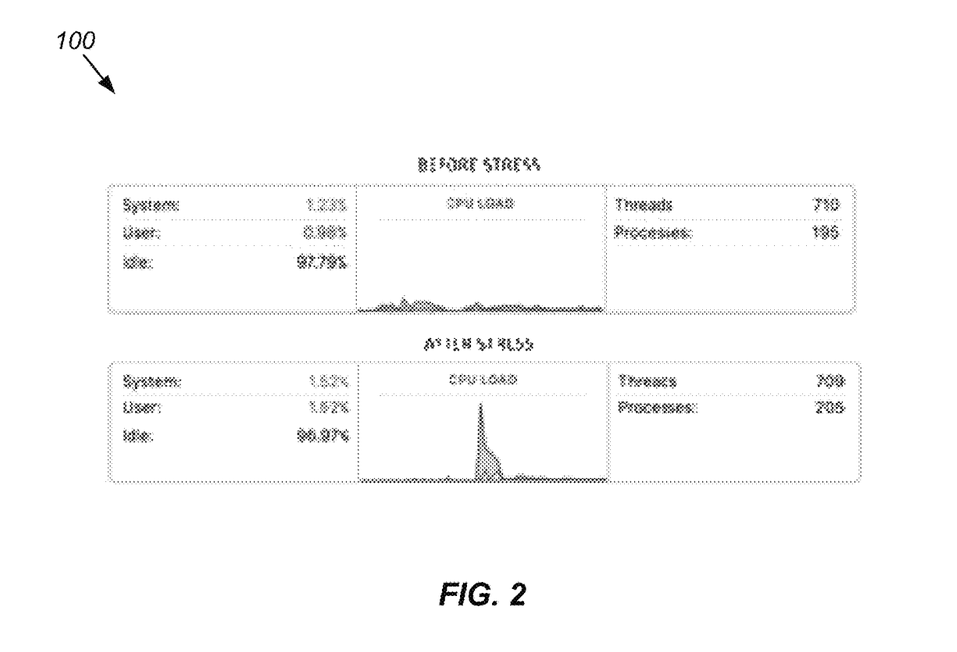
FIG. 2 shows a diagram illustrating the CPU load and performance of a Darwin kernel before and after harmonic stressing.

Software diagnostic tools monitor and address computer load, stability, and environmental control across a network. FIG. 2 shows a diagram 100 illustrating the CPU performance of a Darwin kernel before and after harmonic stressing. FIG. 2 demonstrates how these tools control and measure stress of Central Processing Units (CPUs). In this test, the command % stress -cpu 500 -t5 was executed on a MacBook Pro (Darwin Kernel 14.05) to stress the CPU load. The compiled stress code employs 500 CPU workers (e.g., square root operations) for a duration of 5 seconds. A built-in activity monitor reads and records the CPU load. The top portion of the diagram shows the CPU load before stress, while the bottom portion shows the CPU load after stress. As expected, the CPU load spike is clearly observed under this stress operation.

Figure 3A:
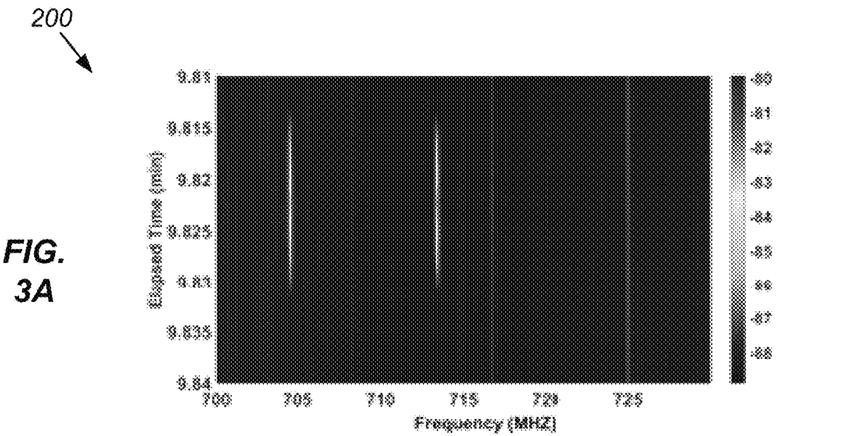
FIGS. 3A and 3B show graphs illustrating induced emissions from the devices measured in FIGS. 1A and 1B.
Figure 3B:
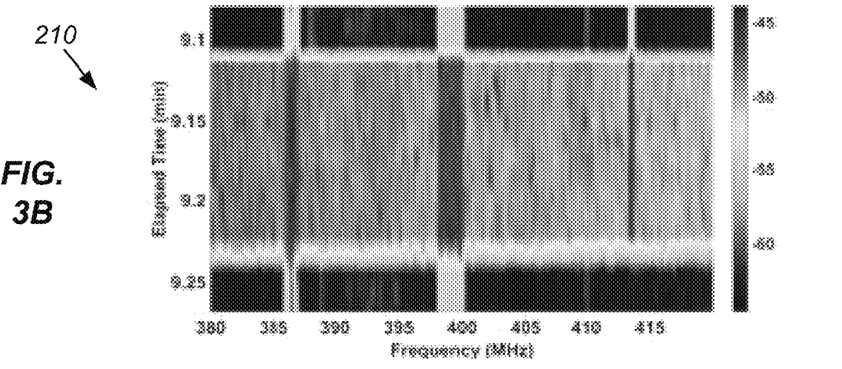

To repurpose this type of stress technique for an embedded computer, the wrapper diagnostic tool, "workload generator for POSIX systems" was used. This tool allows the user to control the stress across memory, file and CPU operations. A similar CPU operation was performed, but on Portable Operating System Interface (POSIX) embedded devices running Linux kernels. FIGS. 3A and 3B show graphs 200 and 210, respectively, illustrating induced emissions from the devices measured in FIGS. 1A and 1B. FIGS. 3A and 3B present measurements for the above stress command, % stress -cpu 500 -t5, executed on the previously aforementioned Raspberry PI (response shown in graph 200) and Intel Galileo 2 (response shown in graph 210).

The results indicate the stress -cpu flag ramping the CPU, inducing new responses around the clock frequencies of these devices. For the Raspberry PI in FIG. 3A, two new narrowband responses appear at 704 MHz and 713 MHz (bandwidth ~30 MHz) for the duration of 1.2 seconds. The magnitude of these two peaks is approximately −82 to −81 dBm. For the Intel Galileo 2 in FIG. 3B, a wider emission response was observed ranging from 380 MHz to 420 MHz for a duration of 7.2 seconds. The previous two bands of 385 MHz to 387 MHz and 397 to 400 MHz were also observed to have an increase in peak magnitude from −54 dBm to −48 dBm.

Discussed below is a series of experiments presented for three different stress loading techniques executed on a Beagle Bone Black Rev C device. The resulting induced emissions are characterized and the different techniques are compared. Each of the following three scripts employs a digital enabler technique to trigger emissions by brute force on an embedded Beagle Bone Black Rev C device running a Linux kernel.

(1) File operation, hard disk drive (HDD)—The write( ) function writes bytes from the buffer to the file referenced by the file descriptor ( ). The unlink( ) function deletes a name from the file system. As an example, stress may be induced using the following execution code: % stress -d 1 -timeout 5s # file (HDD stress).

(2) Memory allocation—The malloc( )/free( ) function allocates size in bytes and returns a pointer to the allocated memory. If the size is 0, then malloc( ) returns either NULL or a unique pointer value that can be passed to free( ). The free( ) function frees the memory space indicated by a pointer, i.e. what is returned by malloc( ). As an example, the command may be executed using the following script: % stress -m 1 -timeout 5s # (Memory stress).

(3) CPU operation—The sqrt( ) function simply returns the nonnegative square root of x. The compiled stress code performs 500 sqrt( ) operations for 5s with the command % stress -cpu 500 -timeout 5s # (CPU stress).

Figure 4:
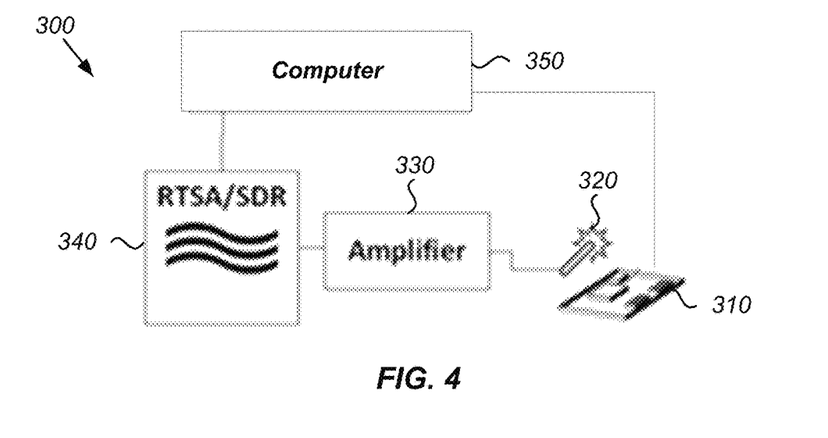
FIG. 4 shows a diagram illustrating an embodiment of a configuration for a system that may be used to perform the embodiments of the method disclosed herein.

FIG. 4 shows a diagram illustrating an embodiment of a configuration for a system 300 that may be used to perform the embodiments of the method disclosed herein. System 300 includes a powered electronic device 310, an electromagnetic compatible (EMC) probe 320 located proximate to powered electronic device 310 to collect the induced controlled electromagnetic emissions from powered electronic device 310, an amplifier 330 connected to probe 320, a software defined radio (SDR) 340 connected to amplifier 330 and configured to receive the emission data, and a computer 350 connected to SDR 340. As an example, system 300 records generated emissions in a very short range of ~2 cm with a few milliseconds per byte using the malloc( ) stress process. However, it should be recognized that other emission detection distances may be possible depending upon the particular hardware used, the expected range of the generated emissions, and the desired level of detection.

In some embodiments, system 300 may neither include amplifier 330 or SDR 340. In such embodiments, probe 320 is connected directly to computer 350 to receive the emission data from powered electronic device 310. Table 1 below lists examples of hardware and software components that may be used for system 300 and that were used for testing.

However, it should be recognized by a person having ordinary skill in the art that other hardware and software components having similar characteristics may be used.

Powered electronic device 310 may be an embedded device, such as a CPU, a graphical processing unit, single-core or multi-core processor, a memory device, a storage device, or any other electronic device or circuitry that draws power. Powered electronic device 310 does not require additional hardware for emission transmission.

Computer 350 may be any computer containing a processor, memory, and a display, such as a laptop, desktop, tablet device, mobile device, and the like. Computer 350 is configured to reconstruct the emission data. As an example, computer 350 may have software loaded thereon particularly suited for this purpose. Computer 350 may also be configured to run one or more software programs configured to stress powered electronic device 310 to induce controlled electromagnetic emissions, such as the diagnostic tools discussed above. As an example, the controlled electromagnetic emissions comprise radio frequency (RF) emissions. In some embodiments, the controlled electromagnetic emissions comprise a repeatable sequence of controlled electromagnetic emissions.

Computer 350 may also be configured via computer-implemented programming code stored therein to use the controlled electromagnetic emissions from powered electronic device 310 to generate an emission profile of powered electronic device 310 operating under stress. Computer 350 may further be configured via computer-implemented programming code stored therein to monitor spurious electromagnetic emissions of powered electronic device 310 in an operational environment and compare the spurious electromagnetic emissions of the powered electronic device 310 in the operational environment with the emission profile of powered electronic device 310 to determine that powered electronic device 310 is operating under stress in the operational environment.

TABLE 1

Hardware and Software

HARDWARE

| Device | Model |
| --- | --- |
| Software Defined Radio | USRP N210 |
| EMC Probes | 100 Series |
| EMC Probe amplifier | 150A |
| Development Platform | Beagle Bone Black Rev C |
| Computer - laptop | MacBook Pro |
| Computer - desktop | HP Xeon |

SOFTWARE (embedded device)

Stress, CRON (job scheduler), python, c, bash

SOFTWARE (receiver end)

GNU RADIO, c, python, OCTAVE, MATLAB

Figure 5:
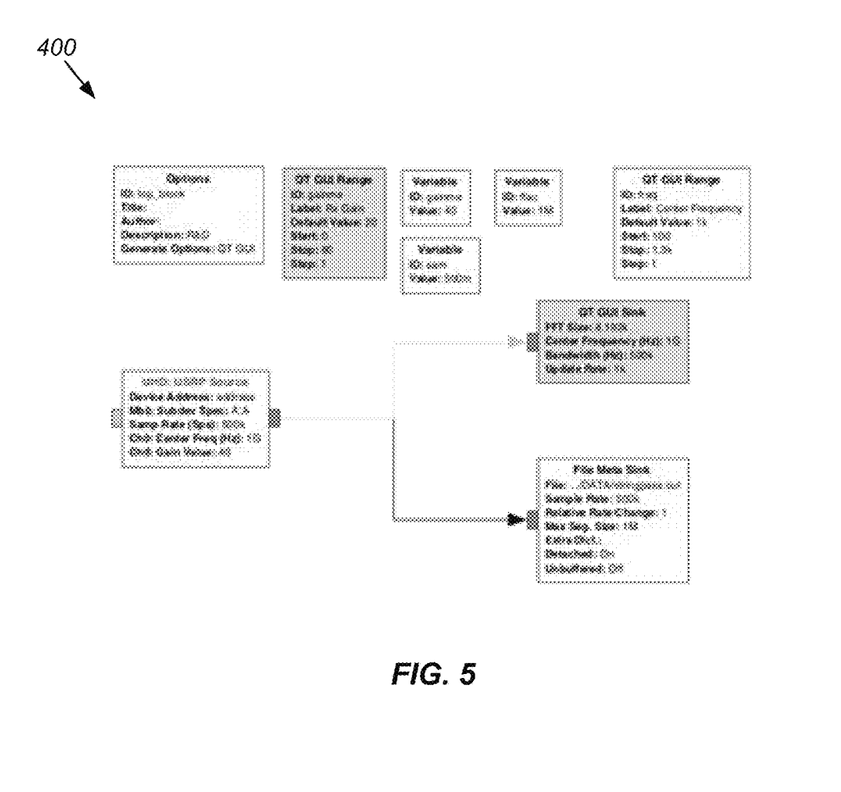
FIG. 5 shows a flow diagram illustrating the data collection procedure coded in a software defined radio.

The SDR source 340 and probes 320 used the following parameters for the tests performed: Center Frequency Fc=1 GHz, Bandwidth BW=1 MHz, Sample Rate SR=500,000 Samples/Second, FFT Size=8192, and probe distance d=2 cm. FIG. 5 shows a flow diagram 400 illustrating the data collection procedure coded in a software defined radio, such as the GNU SDR. In the GNU radio interface the USRP N210 acts as a source for transferring the recorded data into a binary file for post processing (File Sink). For each experiment, a 1 MHz band signal was monitored and recorded with probe 320 as a function of the three stress types.

The plots discussed below present the emission measurements from the Beagle Bone using the three different stress scripts. In all three cases, the emission from the clock frequency of the device at $f_{Clock}=1.0000$ GHz and a controlled induced emission behavior at $f_r=1.0000367$ GHz (FIGS. 6-7) was observed.

Figures 6A, 6B:
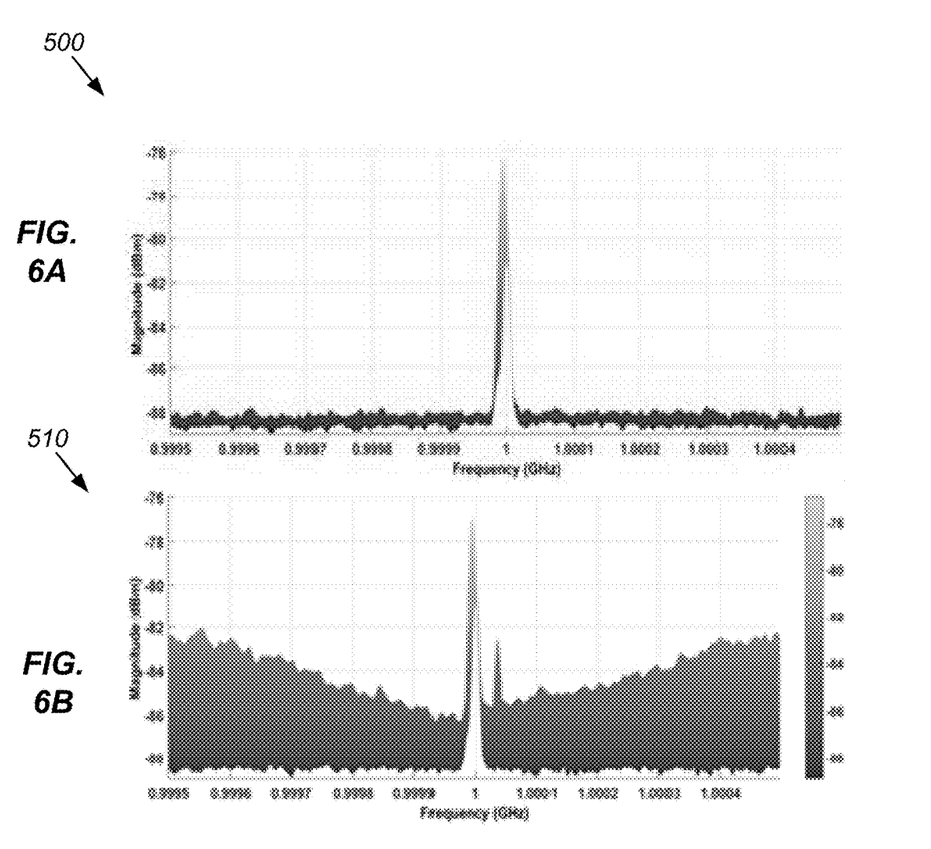
FIG. 6A shows a graph illustrating the normal background emission spectrum response from a Beagle Bone Black device.
FIG. 6B shows a graph illustrating the stress-induced response of the Beagle Bone Black device under a CPU operation test script.

FIG. 6A shows a graph 500 illustrating the normal background emission spectrum response from a Beagle Bone Black device measured with a Tektronix RTSA 3408B. An emission at 1.00000 GHz (bandwidth ~30 MHz) was observed. The magnitude of the peak is −76 dBm and the noise floor is −88 dBm. FIG. 6B shows a graph 510 illustrating the stress-induced response of the Beagle Bone Black device under a CPU operation test script. The induced stress emission is clearly visible at a magnitude of −83 dBm. The significant rise in the noise envelope in the stressed case is characteristic of the CPU workload technique.

Figure 7A:
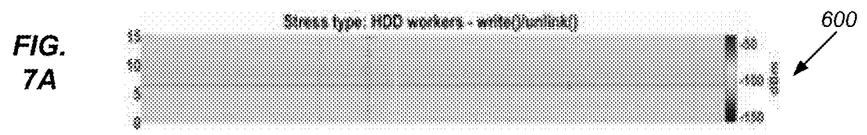
FIGS. 7A-7C show spectrum plots including signals responses and induced noise envelope for stress operations performed on the Beagle Bone Black device's hard disk drive, memory allocation, and CPU.
Figure 7B:
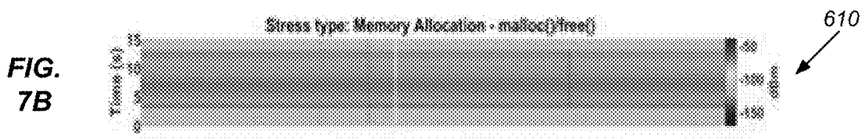
Figure 7C:
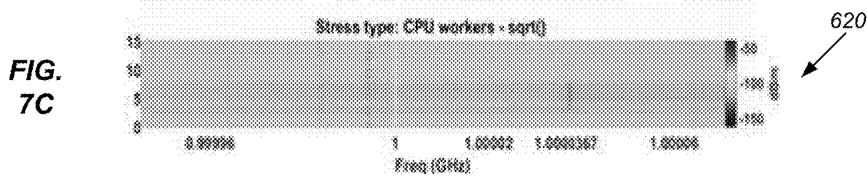

FIGS. 7A-7C show spectrum plots 600, 610, and 620, respectively, including signals responses and induced noise envelope for stress operations performed on the Beagle Bone Black device's hard disk drive (HDD), memory allocation, and CPU. Each stress technique has a unique signal response and induced noise envelope. The memory allocation stress process (FIG. 7B) has the longest RF response at about 8 seconds, while the HDD stress shown in FIG. 7A has the shortest RF response at about 3 seconds. The RF emission from memory allocation shown in FIG. 7B exhibits greater control with induced emission. However, the CPU process shown in FIG. 7C has a higher signal to noise ratio (SNR).

The noise spectrum, $N_s$, is then calculated over 1 MHz bandwidth where the median is within one standard deviation, σ of the signal mean power, using the equation:

$$N_S = \sigma_{S-\bar{S}} > |\bar{S} - \bar{S}| \qquad \text{(Eq. 1)}$$

Figure 8:
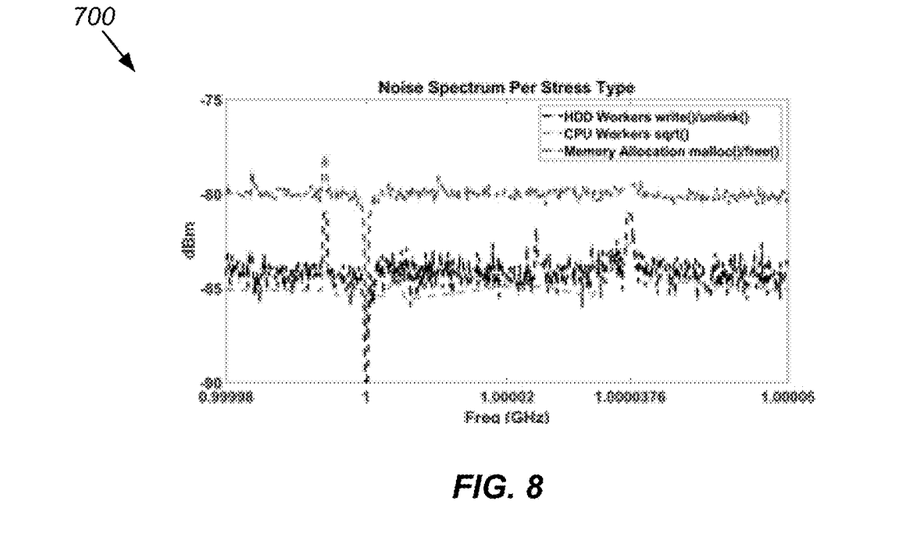
FIG. 8 shows a graph illustrating the noise spectrum over a 1 MHz bandwidth for the stress operations performed on the Beagle Bone Black device's hard disk drive, memory allocation, and CPU.

FIG. 8 shows a graph illustrating the noise spectrum over a 1 MHz bandwidth at peak resonance (1.0000367 GHz) for the stress operations performed on the Beagle Bone Black device's hard disk drive, memory allocation, and CPU. The SNR is defined as the mean power at the peak tone frequency $f_r=1.000367$ GHz divided by the mean noise spectrum, as shown below:

$$SNR = \frac{\bar{S}(F_r)}{\bar{N}_S} \qquad \text{(Eq. 2)}$$

The SNR for HDD stress, CPU stress and dynamic memory allocation was experimentally calculated as 18.336, 34.744, and 30.68 dB, respectively. The malloc( ) memory allocation process speed suggests that the mean noise level is higher than the CPU and HDD process (~−80 dBm vs ~−85 dBm (i.e. faster to access memory than disk)). However, the SNR values at peak tone are higher by ~12 dB and ~15 dB for HDD and CPU respectively, making CPU and HDD stress better candidates at the peak tone frequency. In some embodiments, the CPU stress process may be used to repeatedly induce the desired unwanted emission.

Figure 9:
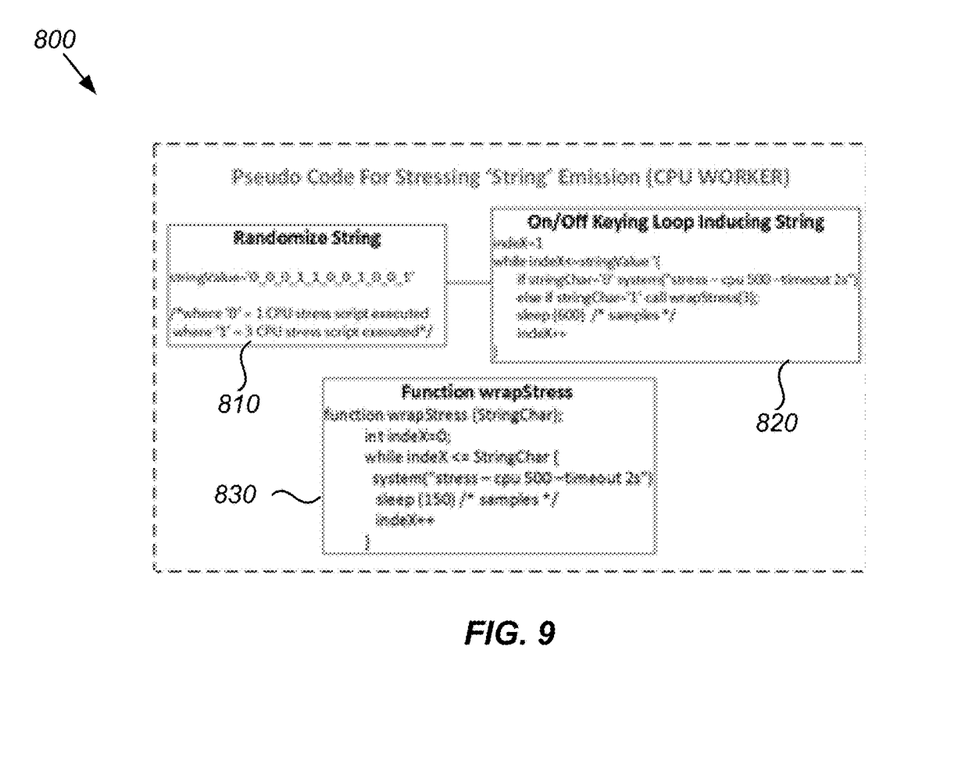
FIG. 9 shows a diagram illustrating pseudo code for inducing a stressing "string" emission.

To investigate the repeatability and control of the software based induced emissions, a sequence of stress scripts is executed as a binary string. FIG. 9 shows a diagram illustrating pseudo code for inducing a stressing "string" emission. A binary string of value '00011001001' is encoded using the Randomize String function 810, using CPU stress techniques and sent over the embedded system with a controlled spurious emission for reconstruction. An event is defined as a stress of around 150 samples. A while-loop pushes 0's and 1's with a 750 sample spacing between digits using the WrapStress function 830. For these tests, a '0' string equals one event and the corresponding induced emission is observed over 150 samples with a 750 sample spacing. A '1' string includes three events and the corresponding induced emission is observed over 150 samples and a spacing of <200 samples between events.

Figure 10:
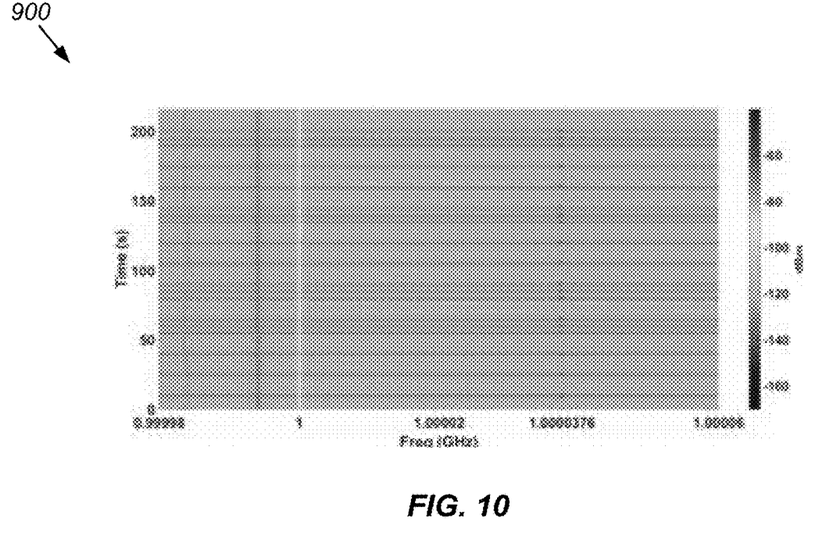
FIG. 10 shows a diagram illustrating a reconstruction of the measured induced emissions of a string as a waterfall plot.
Figure 11:
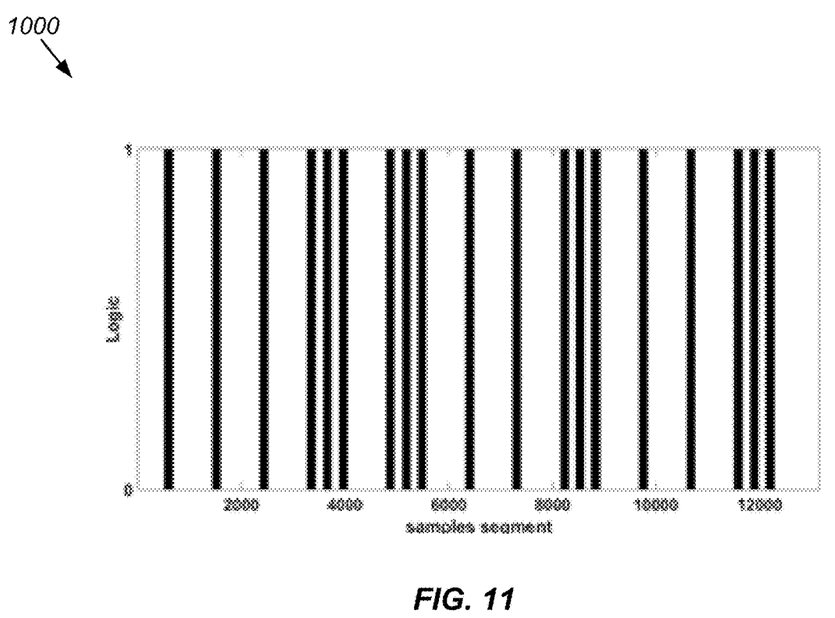
FIG. 11 shows a diagram illustrating a reconstruction of the measured induced emissions of a string as a logic plot.

FIGS. 10 and 11 show diagrams illustrating a reconstruction of the measured induced emissions of a string as a waterfall plot 900 (FIG. 10) and a logic plot 1000 (FIG. 11). As an example, the reconstruction of the string is accomplished using square root operations.

Figure 12:
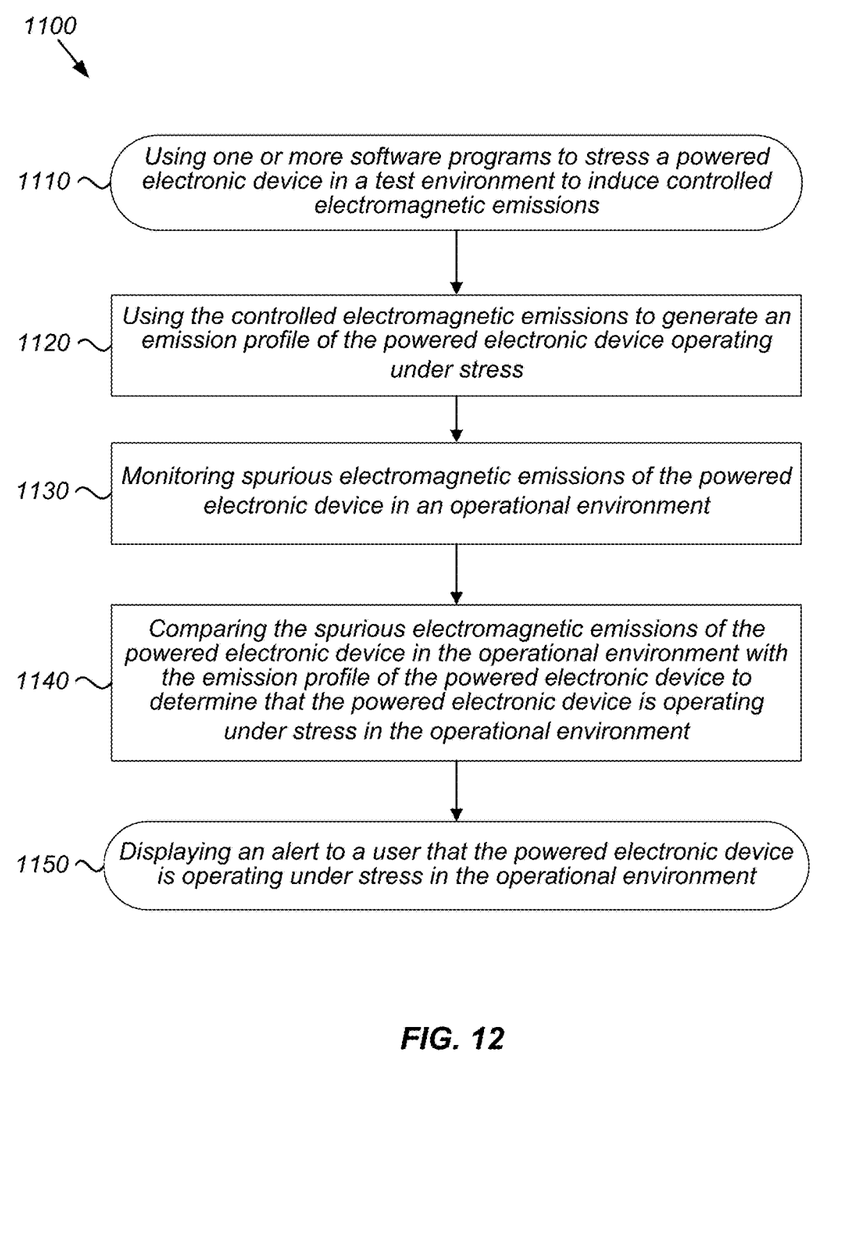
FIG. 12 shows a flowchart of an embodiment of a method in accordance with the embodiments disclosed herein.

FIG. 12 shows a flowchart of an embodiment of a method 1100 in accordance with the embodiments disclosed herein. As an example, method 1100 may be performed by system 300 shown in FIG. 4. Also, while FIG. 12 shows one embodiment of method 1100 to include steps 1110-1150, other embodiments of method 1100 may contain fewer or more steps. Further, while in some embodiments the steps of method 1100 may be performed as shown in FIG. 12, in other embodiments the steps may be performed in a different order, or certain steps may occur simultaneously with one or more other steps. Additionally, some or all of the steps of method 1100 may be performed by computer 350 or by other processing means operatively connected to powered electronic device 310.

Method 1100 may begin with step 1110, which involves using one or more software programs, such as stored on computer 350, to stress a powered electronic device 310 in a test environment to induce controlled electromagnetic emissions from the powered electronic device. As used herein, a "test environment" is a controlled environment that may or may not mimic an environment within which the powered electronic device is intended to operate. In some embodiments, the software programs comprise software diagnostic tools. In some embodiments, the software diagnostic tools monitor and address at least one of load, stability, and environmental control of the powered electronic device. As an example, the stress technique may stress one or more of the processor, memory, storage, or other power components of the device. As another example, the software program could be a high-level or low-level algorithm that scans for expected emissions or uses an interface, such as Intel Corporation's running average power limit interface, to scan for average power.

Each different stress technique used may produce a different and unique emission result. Accordingly, in some embodiments, step 1110 involves using a suite of different software programs to generate a series of induced electromagnetic emissions. In some embodiments, the software program(s) may be run once or more than once to generate the induced electromagnetic emissions. Further, the stress techniques may be applied for any pre-determined amount of time.

Step 1120 involves using the controlled electromagnetic emissions to generate an emission profile of the powered electronic device operating under stress. The emissions induced from powered electronic device 310 are captured by probe 320. In some embodiments, the emissions are received directly by computer 350 which would be specially configured to directly receive such emissions or, in other embodiments, the emissions are amplified by amplifier 330, received by SDR 340, and then are sent to computer 350 as shown in FIG. 4. Computer 350, which may include a processor and memory therein, would then be configured via the appropriate software stored therein, software which is executable by the processor, to correlate the received emissions with the stress techniques used to generate the emissions to generate the emission profile of the powered electronic device. In embodiments where the computer directing the generation of the emissions is not the same computer as the computer receiving the emissions, the computer receiving the emissions may be configured to communicate via a wired or wireless connection with the computer directing the generation of the emissions to enable performance of the correlation and emission profile generation.

The emission profile includes the normal background response of the powered electronic device operating under normal conditions. The emission profile also includes pairings of the details of the particular stress techniques used (i.e. mathematical operations, memory access, hardware read/write operations) and the particular emission spectrum responses received.

Step 1130 involves monitoring spurious electromagnetic emissions of the powered electronic device in an operational environment. As used herein, an "operational environment" is any non-test environment within which the powered electronic device operates. The monitoring in step 1130 may occur using a system such as that shown in FIG. 4 or discussed with reference thereto, with emissions being detected by probe 320 and received for processing by computer 350. Step 1130 may involve monitoring the emissions of the powered electronic device for a predetermined time, for discrete time periods, or indefinitely.

Step 1140 involves comparing the spurious electromagnetic emissions of the powered electronic device in the operational environment with the emission profile of the powered electronic device to determine that the powered electronic device is operating under stress in the operational environment. Such a comparison may be performed by computer 350. The comparison would involve matching up the received emissions of the powered electronic device in the operational environment with emissions stored within the emission profile and determining that a match was made with an emission response that is not the emission response of the device operating under normal conditions, but rather is an emission response where the device is operating under a stressed condition, where the stress condition is a condition that is one that is induced by, for example and as discussed above, using a software stress technique.

Step 1150 involves displaying, via a display device operatively connected to the computer, an alert to a user of the computer based upon the comparison. The alert may indicate to a user of the computer that the powered electronic device is operating under stress in the operational environment. The alert may be any audio, visual, or other indication that alerts the user to the fact that the device is operating under a stressed condition. The alert may include information indicating which part of the device is being stressed. For example, if the device contains a processor and memory, the alert may indicate that the processor only is being stressed, that the memory only is being stressed, or both.

Further, the results provided by method 1100 provide a system designer information about how the system is susceptible to emission leakage. Such information could include which paths of the system are susceptible to emission leakage. A library of power consumption signatures can be created and comparted with a power signature of an executed function and algorithm. This information could be used by the system designer to redesign the system to prevent such leakage, and hence, reduce power consumption of the device.

Additionally, method 1100 could be used as a tool to assist software programmers in determining how new software affects a systems' components and/or energy. In such embodiments, emissions are induced in a powered electronic device running a baseline software program to create an emission profile. The new/upgrades software program is then installed on the powered electronic device and the emissions are monitored and then compared with the stored emissions in the emission profile to see if the new software caused more/less stress on the powered electronic device. The results of the comparison can be provided to the software programmer via a display as described above.

Method 1100 may be implemented as a series of modules, either functioning alone or in concert, with physical electronic and computer hardware devices. Method 1100 may be computer-implemented as a program product comprising a plurality of such modules, which may be displayed for a user.

Various storage media, such as magnetic computer disks, optical disks, and electronic memories, as well as non-transitory computer-readable storage media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the disclosed embodiments are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A method comprising the steps of:
using one or more software programs installed on a computer to stress a powered electronic device in a test environment to induce a repeatable sequence of controlled electromagnetic emissions from the powered electronic device;
using the controlled electromagnetic emissions to generate an emission profile of the powered electronic device operating under stress;
monitoring spurious electromagnetic emissions of the powered electronic device in an operational environment; comparing the spurious electromagnetic emissions of the powered electronic device in the operational environment with the emission profile of the powered electronic device; and
alerting a user that the powered electronic device is undergoing an attack if the spurious electromagnetic emissions exceed the emission profile.

2. The method of claim 1, wherein the software programs comprise software diagnostic tools.

3. The method of claim 2, wherein the software diagnostic tools monitor and address at least one of load, stability, and environmental control of the powered electronic device.

4. The method of claim 1, wherein the powered electronic device is an embedded device.

5. The method of claim 1, wherein the powered electronic device is a central processing unit.

6. The method of claim 1, wherein the powered electronic device is a graphical processing unit.

7. The method of claim 1, wherein the powered electronic device is a memory device.

8. The method of claim 1, wherein the controlled electromagnetic emissions comprise radio frequency emissions.

9. The method of claim 1 further comprising a step of displaying, via a display device operatively connected to the computer, an alert to the user of the computer indicating that the powered electronic device is operating under stress in the operational environment due to the attack on the powered electronic device.

10. A method comprising the steps of:
using one or more software diagnostic tools installed on a computer to stress an embedded device in a test environment to induce a repeatable sequence of controlled electromagnetic emissions from the embedded device;
using the repeatable sequence of controlled electromagnetic emissions to generate an emission profile of the embedded device operating under stress;
monitoring spurious electromagnetic emissions of embedded device in an operational environment;
comparing the spurious electromagnetic emissions of the embedded device in the operational environment with the emission profile of the embedded device to determine that the embedded device is operating under stress in the operational environment: and
triggering an alert if it is determined that the embedded device is operating under stress in the operational environment due to an attack.

11. The method of claim 10, wherein the software diagnostic tools monitor and address at least one of load, stability, and environmental control of e embedded device.

12. The method of claim 10, wherein the embedded device is a central processing unit.

13. The method of claim 10, wherein the embedded device is a graphical processing unit.

14. The method of claim 10, wherein the embedded device is a memory device.

15. The method of claim 10 further comprising a step of displaying, via a display device operatively connected to the computer, an alert to a user of the computer indicating that the embedded device is operating under stress in the operational environment due to the attack on the embedded device.

16. A system comprising:
a powered electronic device;
an electromagnetic probe located close enough to the powered electronic device to collect spurious electromagnetic signals from the powered electronic device, wherein the electromagnetic probe is separated from the powered electronic device by an air gap, and wherein the spurious electromagnetic signals are unintended emissions inherent to powered electronic components;

a computer, communicatively coupled to the electromagnetic probe, wherein the computer comprises a memory store having an emission profile of the powered electronic device stored therein, wherein the emission profile represents the spurious electromagnetic emissions behavior of the powered electronic device under a variety of controlled conditions, wherein the computer is configured via computer-implemented programming code stored therein to monitor spurious electromagnetic emissions of the powered electronic device in an operational environment and compare the spurious electromagnetic emissions of the powered electronic device in the operational environment with the emission profile of the powered electronic device and further configured to trigger an alert when the computer determines based on the comparison that the powered electronic device is operating under stress in the operational environment due to an attack on the powered electronic device.

17. The system of claim 16, wherein the powered electronic device is a central processing unit.

18. The system of claim 16, wherein the powered electronic device is a graphical processing unit.

19. The system of claim 16, wherein the powered electronic device is a memory device.

20. The system of claim 16, wherein the computer has a display device operatively connected thereto, wherein the computer is further configured to display via the display device an alert to a user of the computer indicating that the powered electronic device is operating under stress in the operational environment.

* * * * *